US005971285A

United States Patent [19]

Knapp

[11] Patent Number: 5,971,285

[45] Date of Patent: Oct. 26, 1999

[54] THERMOSTATICALLY CONTROLLED MIXING VALVE

[75] Inventor: Alfons Knapp, Biberach, Germany

[73] Assignee: Masco Corporation of Indiana, Indianapolis, Ind.

[21] Appl. No.: 08/981,138

[22] PCT Filed: Mar. 26, 1997

[86] PCT No.: PCT/US97/04790

§ 371 Date: May 11, 1998

§ 102(e) Date: May 11, 1998

[87] PCT Pub. No.: WO97/36219

PCT Pub. Date: Oct. 2, 1997

[30] Foreign Application Priority Data

Mar. 26, 1996 [IT] Italy ............................ TO96A000231

[51] Int. Cl.[6] ................................................. G05D 23/13

[52] U.S. Cl. ........................................... 236/12.2; 251/900

[58] Field of Search ............................... 236/12.2, 12.21, 236/12.22; 251/900

[56] References Cited

U.S. PATENT DOCUMENTS

| | | | |
|---|---|---|---|
| 3,004,761 | 10/1961 | Couffer, Jr. et al. | 236/12.2 |
| 3,765,604 | 10/1973 | Trubert et al. | 236/100 |
| 3,929,283 | 12/1975 | Delpla | 236/12.2 |
| 4,577,870 | 3/1986 | Scott et al. | 277/1 |
| 5,037,067 | 8/1991 | Ray | 251/900 |
| 5,148,976 | 9/1992 | Reid | 236/12.2 |
| 5,356,074 | 10/1994 | Limet et al. | 236/12.2 |
| 5,379,936 | 1/1995 | Kline | 236/12.2 |
| 5,579,992 | 12/1996 | Masatoshi et al. | 236/12.21 |

*Primary Examiner*—William E. Tapolcai
*Attorney, Agent, or Firm*—Myron B. Kapustij; Leon E. Redman

[57] ABSTRACT

A retaining device for frictionally retaining two mobile parts of a thermostatically controlled mixing valve. The first part of the mixing valve contains a cavity having a side wall, a top wall, and a bottom wall. An O-ring type packing washer is disposed in the cavity and frictionally grips a surface of the second mobile part. The axial distance between the top wall and bottom wall of the cavity is less than the cross-sectional diameter in the axial direction of the ring-shaped packing washer. The packing washer is thus compressed axially and establishes a frictional hold between the top wall and the bottom wall of the cavity and the axially extending surface of the second mobile part. The diameter of the cavity is greater than the diameter of the compressed ring-shaped packing washer thereby forming a ring-shaped space or chamber between the washer and the side wall. This ring-shaped space communicates with a water holding area of the mixing valve through a groove in the bottom wall of the cavity.

10 Claims, 4 Drawing Sheets

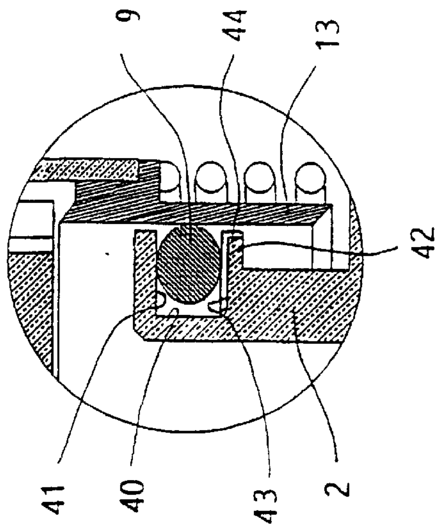
Fig. 3
Fig. 1
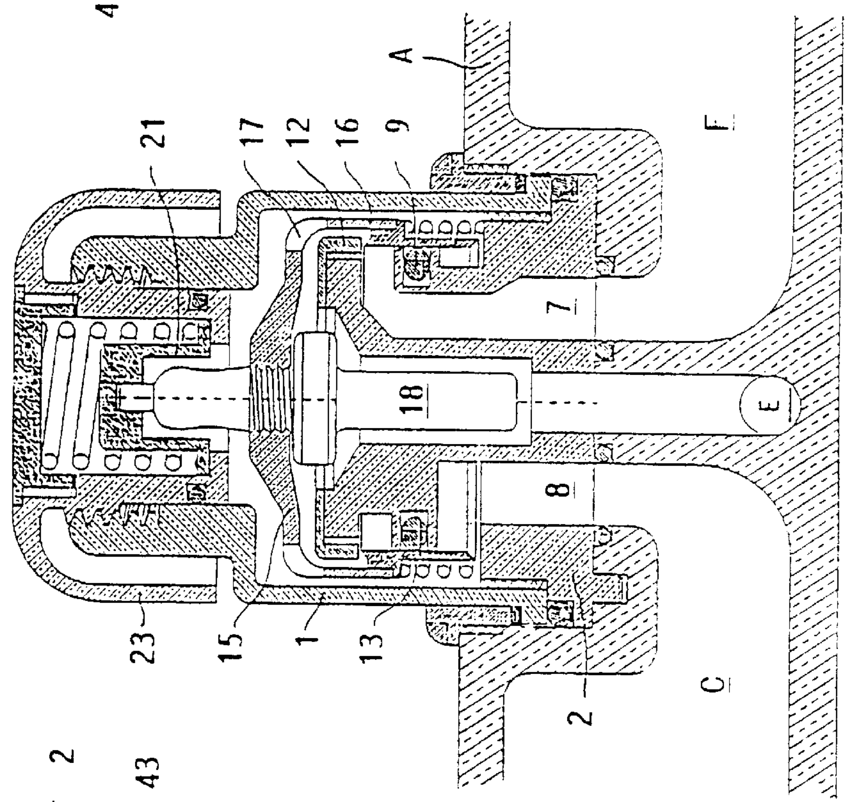
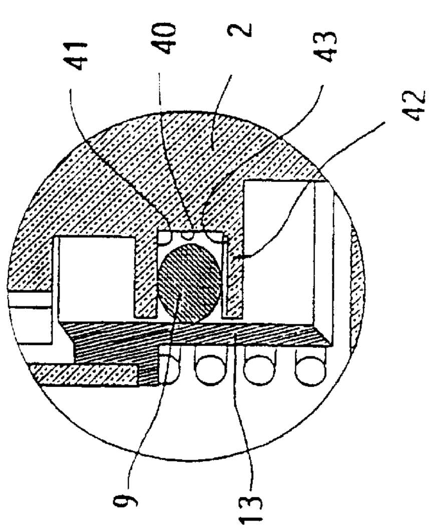
Fig. 2

THERMOSTATICALLY CONTROLLED MIXING VALVE

FIELD OF THE INVENTION

This invention relates to a thermostatically controlled mixing valve provided with an improved device, such as a packing washer, for radial retention between two relatively mobile parts.

BACKGROUND OF THE INVENTION

Ring-shaped packing washers with a circular cross-section, so-called O-rings, are widely used for providing a frictional grip between various parts in various types of valves. These ring-shaped packing washers are economical, they are easy to install, and they generally provide quite satisfactory performance. The conventional way in which this type of packing washer is used to establish a radial hold is by inserting it in a ring-shaped cavity in one of the parts between which the grip or hold is to be established. The dimensions of this cavity, taking into account the play between the parts, are such that the circular cross-section of the O-ring is radially compressed between the bottom of the cavity and the surface. In the axial direction the cavity should be sufficiently deep so that following radial compression, the dimension of the packing washer along the axial direction increases so that its original circular section becomes oval with a smaller diameter in the radial direction than in the axial direction. This arrangement lends itself to establishing a hold or frictional grip between the working parts that are fixed with respect to each other. However, when one wishes to establish a radial hold between relatively mobile parts, this arrangement can give rise to problems if the parts themselves, as the apparatus functions experience a change in their dimensions, for example, because of different thermal expansions. In this case the degree of radial compression of the packing washer is modified and the packing washer which is excessively stressed by an increase in the radial compression may obstruct or impede the relatively displacement between the parts. This becomes a serious problem especially if the force available for displacing a mobile part is limited, as is the case in thermostatically controlled mixing valves, especially on the return run which is driven by a spring whose force is not very high. Problems similar to those caused by thermal expansions may also arise due to variance of the design dimensions of such parts. The problems discussed with relation to the use of an O-ring can also be found in the use of other types of packing washers, such as the so-called quadrings (retaining rings with four lips).

Japanese patent application No. 58-68546 proposes a retaining device consisting of an O-ring for a piston movable in a cylinder where, for the purpose of increasing the service life of the packing washer and increasing its pressure against the surface of the cylinder, an O-ring is inserted in a cavity that holds it axially and whose bottom is spaced away from the O-ring so as to form a ring-shaped chamber and from this chamber runs a duct that empties out upon the surface of the piston head. In this way, the pressure generated by the piston is transmitted to the ring-shaped chamber and forcefully pushes the O-ring against the wall of the cylinder.

SUMMARY OF THE INVENTION

The object of the present invention is to provide a holding or gripping device that works radially between two movable parts of a thermostatically controlled mixing valve that employs ring-shaped packing washers of the O-ring type using the advantages provided by them but which, at the same time, avoids the above-mentioned problems. The instant invention uses a concept somewhat similar to the one described in the above-cited Japanese patent, although for a substantially opposite purpose. This is due to the fact that in thermostatically controlled mixing valves the radially functional packing washer is not intended to resist a considerable pressure, but only to create a separation between hot water and cold water, which have approximately the same pressure. Thus, there are no problems regarding the service life of the packing washer and there is no need to increase the pressure. On the contrary, it is desirable to prevent the pressure from increasing in an undesirable fashion. Moreover, the fact that there is a proper duct provided between the ring-shaped chamber and another part of the apparatus, as suggested by said Japanese patent for a piston, would in a thermostatically controlled mixed valve require extra manufacturing steps that would result in an unacceptable increase in cost.

The object of the invention is achieved in a valve, such as a thermostatically controlled mixing valve, by the use of a radial retention or gripping element that comprises a first part which contains a cavity, said cavity having a bottom that consists of an axially extending wall and two radially extending walls that face each other axially, that receives a ring-shaped packing washer. The ring-shaped packing washer is inserted in said cavity and cooperates with a surface of a second part. The cavity between the radially extending walls has a dimension in an axial direction that is less than the undeformed diameter in the axial direction of the cross-section of the ring-shaped packing washer. The difference between said diameter and said dimension being sufficient so as to axially compress the ring-shaped packing washer to the extent necessary so that a hold or grip is established between the ring-shaped packing washer and said radially extending surfaces.

Considering the fact that the ring-shaped packing washer is in a compressed condition in said cavity, the diameter of the ring-shaped packing washer differs from the diameter of the cavity so that a hold or grip is established under the desired conditions between the ring-shaped packing washer and the surface of the second part. The side of said cavity has a diameter which, looking in the radial direction, differs from the diameter of the region of the ring-shaped packing washer that is opposite the one that is intended to cooperate with said surface of the second part when the ring-shaped packing washer is held in a compressed condition in said cavity when necessary to leave a ring-shaped chamber free between said side of the cavity and said ring-shaped packing washer. A passage is formed in said first part of the apparatus to enable the ring-shaped chamber to communicate with a space in the apparatus intended to contain a fluid. The packing washer is so arranged as to separate a space intended for cold water from a space intended for hot water. The passage consists of at least one radially extending groove made in one of the radially extending walls of said cavity or in a corresponding manner in the packing washer itself.

Due to these features the wear and tear of the second part of the thermostatically controlled mixing valve with respect to the ring-shaped packing washer and, hence, with respect to the first part, depends only on the diameter of the surface of the second part that cooperates with the packing washer and on the diameter of the cooperating region of the ring-shaped packing washer in its compressed condition. This wear and tear is entirely independent of any variation in the diameter of the first part due, for example, to thermal distortion or expansion. It is therefore sufficient to design said second part and the ring-shaped packing washer so that under any operating condition the pressure between the ring-shaped packing washer and the cooperating surface of the second part will merely be adequate. There is no need to take into account any possible variations in the diameter of the first part. Any possible changes in the dimensions of the first part due, for example, to thermal distortion or expansion, will influence only the degree of axial compression of the ring-shaped packing washer. This is negligible considering the small diameter of the cross-section of the packing washer in the axial direction relative to its working diameter in the radial direction. Consequently, there is no impairment in the operation of the thermostatically controlled mixing valve using this retaining device due to different expansions between its parts.

Preferably, the groove is in the wall of said cavity that is in the part of the space intended for cold water, or in the corresponding part of the ring-shaped washer.

When necessary, a groove extending in an axial direction can extend said groove in a radial direction so as to ensure adequate communication with a space of the apparatus intended for water.

Preferably, the packing washer consists of an O-ring, a quadring (retaining ring with four lips), or a ring-shaped packing washer with a different cross-section.

In a preferred embodiment the cavity containing the packing washer is on the outside surface of a first internal part of the thermostatically controlled mixing valve, and the surface of the second part, which is intended to cooperate with the packing washer, is an internal surface. This form is particularly preferred because in cases where the internal part is stamped out of plastic material the groove can be formed during the stamping operation while the external part is often metallic.

In this case the outside diameter of the ring-shaped packing washer in its compressed state is greater than the diameter of the internal surface of the second part so that a hold or grip will be established between the ring-shaped packing washer and said internal surface of the second part, and the bottom of said cavity will have a radial diameter that will be less than the internal diameter of the ring-shaped packing washer in its compressed condition. In this way, the ring-shaped chamber between said bottom and said ring-shaped packing washer is obtained.

The indicated arrangement of a ring-shaped packing washer with respect to a first and a second part can also be inverted when the opportunity arises. In such case the internal diameter of the ring-shaped packing washer in its compressed state is less than the diameter of the external surface of the second part, and this is so that a hold or grip will be established under desired conditions between the ring-shaped packing washer and said external surface of the second part, and the bottom of said cavity will have a radial diameter that is greater than the outside diameter of the ring-shaped packing washer in its compressed state. In this manner the ring-shaped chamber between said bottom and said ring-shaped packing washer is obtained.

BRIEF DESCRIPTION OF THE DRAWINGS

FIG. 1 is a side elevational view of a thermostatic mixer that has a retaining device according to the invention;

FIG. 2 is a detail of the retaining device on a larger scale;

FIG. 3 is a variant of the retaining device illustrated in FIG. 2;

DESCRIPTION OF THE PREFERRED EMBODIMENT

Figure 4:
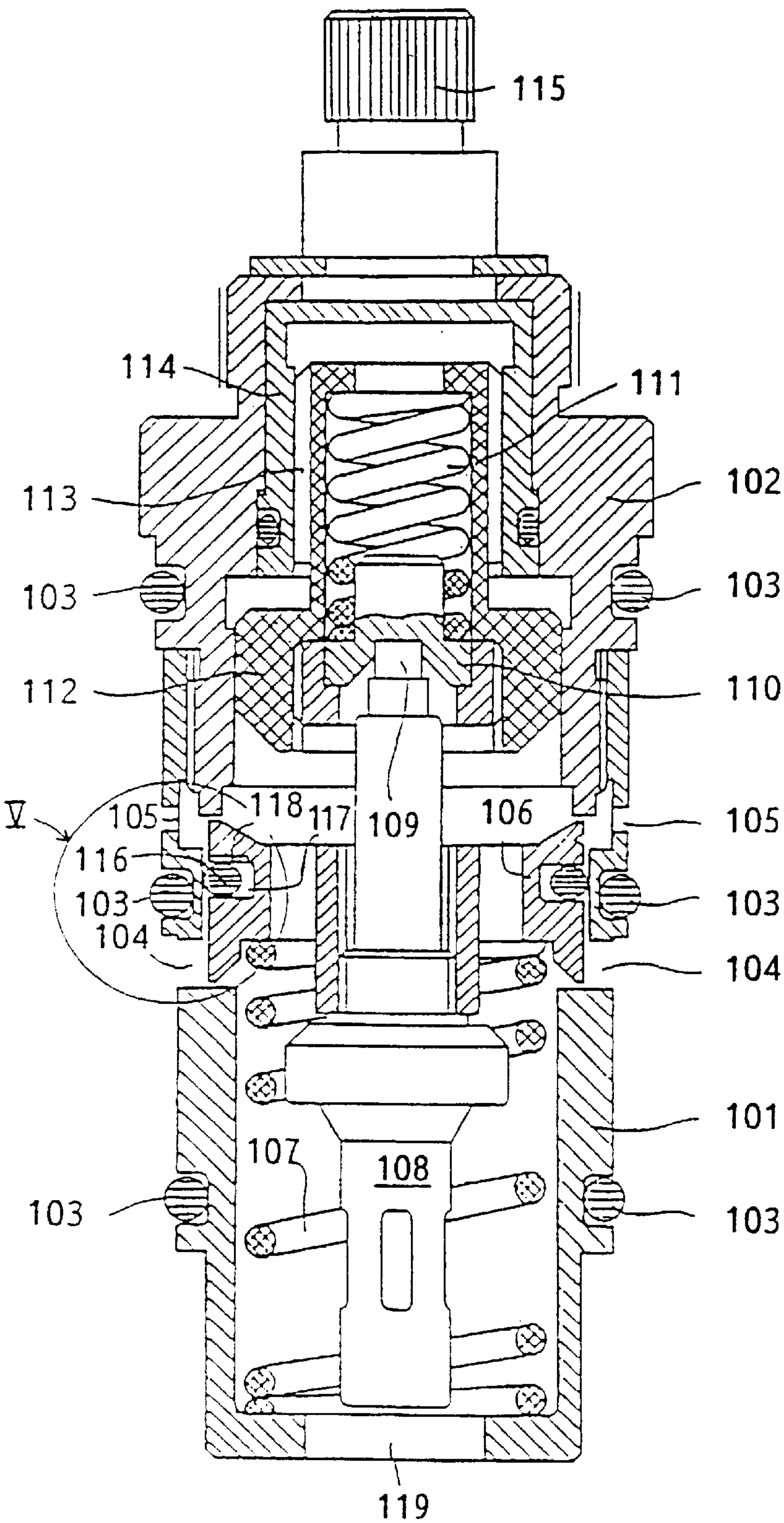
FIG. 4 is a side elevational view in section of a thermostatic mixer of the cartridge type equipped with a ring-shaped packing washer installed according to the invention.

The thermostatic mixer illustrated in FIG. 1 is of the type described in Italian Patent Application No. TO94A000360. The retaining device according to the instant invention is particularly suitable for use with a thermostatically controlled mixing valve. This is why it is described in this context, although it is to be understood that the device itself can be used in any other type of thermostatic mixer. Furthermore, provision is made for the employment of ring-shaped packing washers of the O-ring type in the embodiment described. It is, however, to be understood that the invention includes the employment of any type of ring-shaped packing washer that performs in the manner described.

With reference to FIG. 1, letter A indicates a collector comprising incoming ducts C for hot water and F for cold water and a duct E for mixed water. Applied to this collector A is a thermostatic faucet that has an outside body 1 with an inside body and bottom 2, in which are provided tapping duct 6, cold water duct 7, and hot water duct 8 corresponding to passages E, F and C of collector A. A mobile box 13 cooperates with body 2 and with an upper member 12 to change the passage cross-section of ducts 7 and 8 toward a mixing chamber 17 that communicates with the water tapping duct 6. In the path of the mixed water there is disposed a temperature sensitive element 18 whose top abuts against a collar 21. Collar 21 is carried by a regulating handle 23 by means of which you can regulate the temperature of the mixed water. The temperature sensitive element 18 via transmission member 15, 16 causes displacement of box 13. To keep the hot and cold water separated, box 13 is tightly and movably mounted with respect to body 2, and the hold or grip is established by an O-ring 9 disposed in a cavity in body 2. This brief description of the thermostatic mixer is considered sufficient for the purposes of this invention. Further details on the structure and operation of this thermostatic mixer are disclosed in Italian Patent Application No. TO94A000360, incorporated herein by reference.

In the instant case, the first part of the apparatus that is involved in the use of the instant invention is a part that protrudes from the operatively fixed bottom 2, while the second part is movable box 13. The grip is established between these two parts by O-ring 9, which is disposed in a cavity of the protruding part of body 2 and which, due to its greater diameter, cooperates with the internal surface of box 13 as illustrated in FIG. 2.

The cavity in which O-ring 9 is disposed is defined by an upper wall 41, a lower wall 42 and a side wall 40. Side wall 40 extends axially, while walls 41 and 42 extend radially and face each other. The distance separating radial walls 41 and 42 of the cavity is less than the undeformed diameter of O-ring 9. O-ring 9 in its uncompressed state has a circular cross-section. When it is inserted in the cavity it undergoes axial compression and its cross-section becomes oval, as illustrated in FIG. 2. Furthermore, side wall 40 of the cavity has a radial diameter that is less than the internal diameter of the thus deformed O-ring so there is a certain amount of play in the form of a ring-shaped chamber between side wall 40 of the cavity and O-ring 9. Therefore, when in the installed condition, O-ring 9 is slightly deformed by walls 41 and 42, but there remains a space between deformed O-ring 9 and side wall 40 of the cavity. The peripheral region of maximum diameter of O-ring 9 which results from the deformation of O-ring 9 due to the axial compression it undergoes, cooperates with the inside surface of box 13. The contact pressure between O-ring 9 and box 13 is due to the fact that O-ring 9, being axially compressed, has an outer diameter that is greater than the inner diameter of box 13. In construction of the device, therefore, one will select the diameter of the O-ring 9 as a function of the deformation it undergoes due to the effect of axial compression, and one will take into account the force that is exerted against box 13 as a function of the elasticity of the material comprising O-ring 9.

It is thus possible to ensure that the force which O-ring 9 exerts against box 13 will have the desired value. Once this has been achieved the force will then remain constant, even though the material of body 2 undergoes thermal expansion which increases its diameter. As can be seen from FIG. 2, a slight increase in the diameter of part of body 2, which is disposed in the cavity for O-ring 9, will not in any way influence the relationship between the O-ring and the box.

The expansion of material of body 2 also causes a slight variation of the distance between walls 41 and 42 of the cavity and, hence, a slight modification of the axial compression of the O-ring. However, considering the short distance between said walls 41 and 42, this expansion is negligible, so that the phenomenon now indicated will not have any practical effect on the performance of the retaining device.

As can be seen in FIG. 2, a groove 43 is provided in wall 42 of the cavity in body 2 so as to receive O-ring 9. This groove constitutes a passage that provides communication between the ring-shaped chamber situated between O-ring 9 and bottom wall 40 of the cavity and the space around the periphery of body 2. In other words, with a space intended for water, in this case the cold water that is supplied through passage 7. Groove 43 can be provided without any increase in cost during the stamping of body 2 which can be of plastic. With this arrangement there is transmitted to the surface of O-ring 9 which faces toward the inside of the cavity a pressure that is at least approximately equal to the pressure of the water that acts directly on the surface of O-ring 9 which faces toward the outside of the cavity. Thus no appreciable force is applied on O-ring 9 due to the effect of the pressure of water that is supplied to the mixer. Therefore, the operation of the mixer is not disturbed by any variations in the supply pressure.

If there is any reason to fear that the communication established by radial groove 43 is not permanently open, it can be extended by an axial groove 44 that extends along the casing of body 2, as shown by the variant in FIG. 3.

By means of the simple device of the instant invention, there is no increase in the cost of manufacturing and assembly of the apparatus of the instant invention. Additionally there is no diminution in the advantages inherent in the employment of a packing washer of the O-ring type or any other similar type such as, for example, a quadring, as a retaining or sealing washer, and the disadvantages mentioned hereinafore are eliminated. Making passage 43 in the form of a groove does not require any additional or special work because said groove can be obtained during the stamping of body 2 which, as was noted earlier, is made of plastic.

It should be noted that a circular cross-section for the O-ring has been described which is what is usually employed, the invention is not limited to a circular cross-section and may be applied in the same way to great advantage to an O-ring having an elliptical cross-section or to packing washers having another cross-section which, however, would perform in the manner provided for use by the invention.

The thermostatic mixer illustrated in FIG. 4 comprises a cartridge shell that consists of two parts 101 and 102 that are connected to each other by screws and are provided on the outside with packing washers 103 for retention in the cavity of a mixer body (not shown) intended to contain the cartridge. Part 101 of the shell has opening 104 for the intake of hot water, opening 105 for the intake of cold water, and an opening 119 for drawing the mixed water. In this example, the water tapping opening is shown in an axial position, but it can be arranged in any other position. Inside part 101 of the shell is disposed a box 106 that is axially movable in relation to openings 104 and 105 so as to be able at least partially occlude these openings. Box 106 is biased axially upwardly by a return spring 107. Connected to box 106 is a thermometric element with thermal expansion 108 that pushes box 106 against the action of spring 107 in a known manner when element 108 is expanded due to the effect of a temperature rise. For this purpose, a shank 109 of thermometric element 108 abuts against a plate 110 that is retained by safety spring 111 in a slide 112, which is axially movable in part 102 of the shell and which is joined together at 113 with a collar 114. This collar is rotatably mounted but cannot be shifted axially in part 102 of the shell and is connected to a clutch 115 for a regulating handle. The arrangement thus described makes it possible, by rotating a regulating handle connected to clutch 115, to shift slide 112 axially with plate 110 against which abuts shank 109 of thermometric element 108, thus modifying the regulation of the thermometric element and the temperature of the mixed water.

Figure 5:
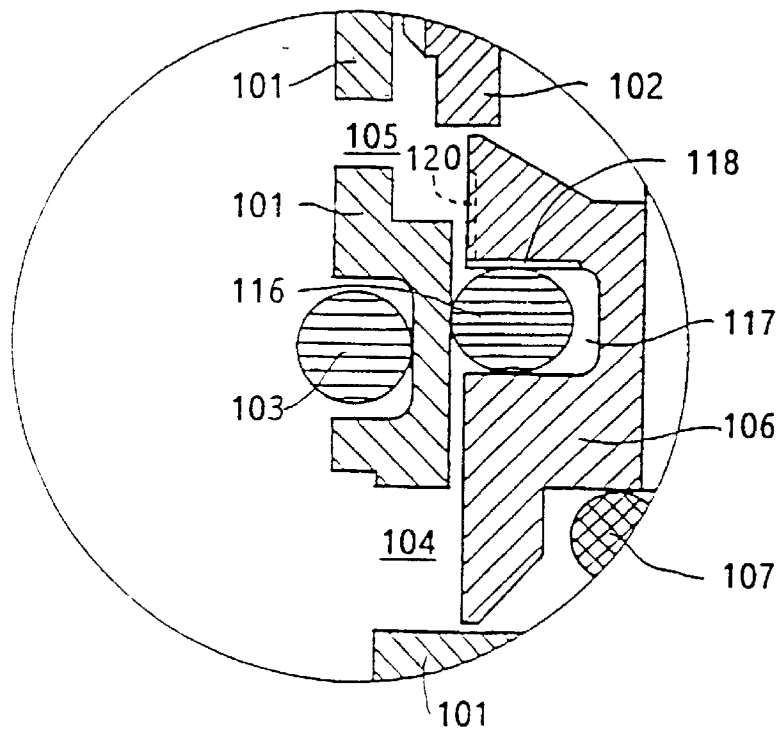
FIG. 5 is an enlarged view of the area contained in zone V of FIG. 4.

The hold between mobile box 106 and the inside surface of part 101 of the cartridge shell is established by a packing washer 116 which, in this particular embodiment, is of the O-ring type and which is seated in a seat 117 in mobile box 106. As best seen in FIG. 5, seat 117 is narrower than the axial thickness of packing washer 116 so that washer 116 will grip tightly due to axial compression. Washer 116 does not touch the side of seat 117. The outside surface of packing washer 116 can be in contact with the inside surface of part 101 of the cartridge shell and provides a radial grip by virtue of its elasticity and the ratio between its own outside diameter and the diameter of the inside surface of part 101.

Under these conditions, the contact pressure between packing washer 116 and the wall of the cartridge shell is not altered by any inaccuracies in the radial dimensions of the box and of the seat of the packing washer, nor by any thermal expansions that may be different from those of the cartridge shell. The thermal expansions of the box do not significantly affect the axial compression of the packing washer, considering the small axial extent of the latter. It is therefore sufficient for the packing washer and the inside surface of the cartridge shell to be built in their reciprocal relationship so as to produce a sufficient grip with minimum possible wear and tear under any condition.

Through groove 118 in radial wall of cavity 117 in box 196 the bottom of seat 117 communicates with the casing of said box in a region which, through opening 105, communicates with the cold water intake. Therefore, at the bottom of seat 117 there exists a pressure equal to the supply pressure. Packing washer 116 is subjected along its entire surface to at least an approximately uniform pressure, and there are no deformations due to significant pressure differences. Further abnormal pressures or pressure drops that arise at the bottom of seat 117 do not deleteriously affect its functioning.

It is to be understood that groove 118 can be in the opposite wall of cavity 117 and could lead to intake opening 104 rather than 105. It is also to be understood that ring-shaped packing washer 116 can have any suitable cross-sectional shape besides the circular one given by way of example.

In order to ensure that the communication established by radial groove 118 is permanently open, it may be extended by an axial groove 120 extending along the casing of mobile box 106.

Figure 6:
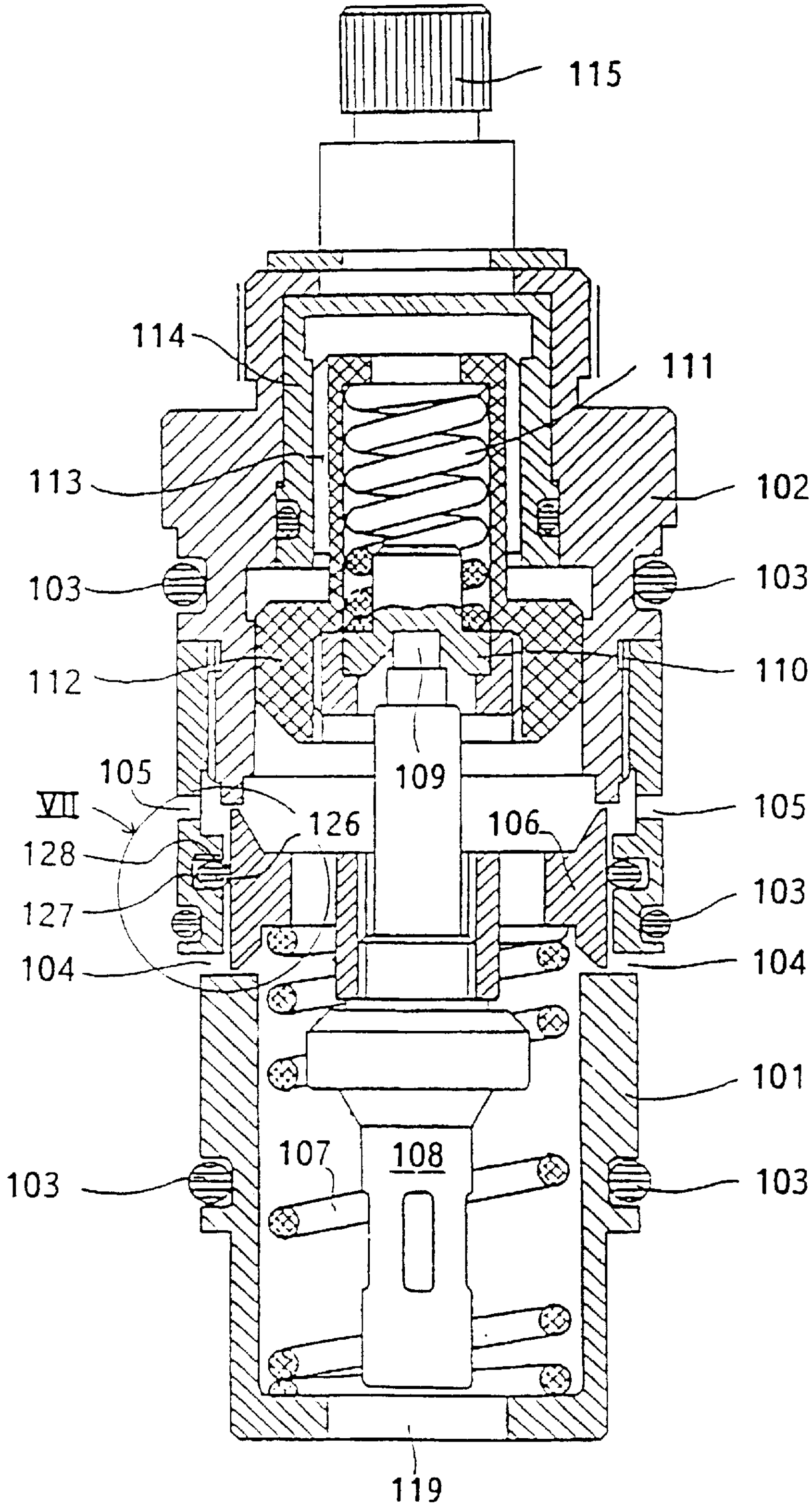
FIG. 6 is similar to FIG. 4 and illustrates a thermostatic mixer equipped with a ring-shaped packing washer installed according to another embodiment of the invention.

In the embodiments shown in FIG. 4 and described hereinafore and in FIG. 6, there is an indirect advantage deriving from the use of the instant invention. In similar embodiments according to the conventional technique the movable box must be made of metal because the high heat expansion coefficient of plastic could lead to clogging of the apparatus. Since the metal is susceptible to calcium encrustations, the box is lined with tetrafluoroethylene. This is a very expensive operation. In the instant invention the mobile box can be made of plastic material which is not subject to any calcium deposits. This makes it very economical because the expansion of this plastic material no longer presents any problems.

In the embodiment illustrated in FIG. 5, most of the components of the thermostatic mixer are identical to those described in the embodiment illustrated in FIG. 4 and will therefore not be described any further. However, the grip between movable box 106 and the inside surface of part 101 of the cartridge shell is established by a packing washer 126 that, in this embodiment, is of the O-ring type and is disposed in a seat 127 in wall 101 of the cartridge shell.

Figure 7:
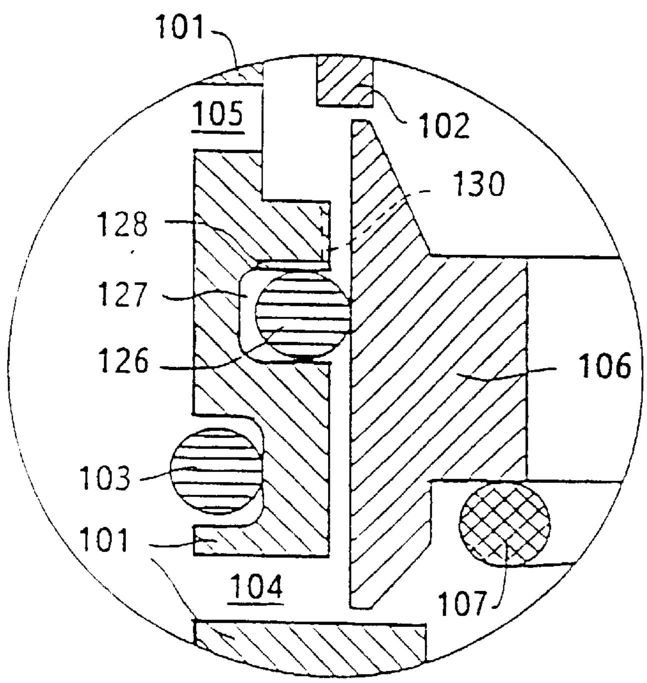
FIG. 7 is an enlarged view of the area contained in zone VII of FIG. 6.

As seen in FIG. 7 seat 127 is narrower than the axial thickness of packing washer 126 so that the washer 126 grips tightly due to axial compression. Washer 127 does not touch the side of seat 127. The inside surface of packing washer 126 can be in contact with the outside surface of box 106 and is held radially because of its own elasticity and the ratio between its own inside diameter and the diameter of said outside surface of box 106.

Under these conditions the contact pressure between packing washer 126 and the outside surface of box 106 is not affected by any differences in the radial dimensions of the cartridge shell and of the seat of the packing washer nor by any heat distortions or expansions different from those of the box. The heat distortions or expansions of the cartridge shell do not substantially affect the axial compression of the packing washer considering the small axial extent of the washer. It is therefore adequate to ensure that the packing washer and the outside surface of the box are built taking into account their reciprocal relationship so as to produce a sufficient grip with minimum possible wear and tear.

The ring-shaped chamber that constitutes the side of seat 127 communicates, through a groove 128 in an axial wall of cavity 127 of part 101 of the cartridge shell, with the inside surface of the cartridge shell in a region which leads to aperture 105 which communicates with the cold water intake. Therefore, at the side of seat 127 there exists a pressure that is equal to the supply pressure and packing washer 126 is subjected along its entire surface to an at least approximately uniform pressure. Washer 126 is, therefore, not subject to deformation due to significant pressure differences, nor do abnormal pressure or pressure drops that may arise at the side of seat 127 present any difficulties. Groove 128 could also be made in the opposite wall of cavity 127 and could thus come out of intake opening 104 rather than intake opening 105. Ring-shaped packing washer 126 could have any suitable cross-sectional shape instead of the circular one given by way of example. Radial groove 128 can also be extended by an axial groove 130 on the inside surface of part 101 of the cartridge shell.

Furthermore, in embodiments of the type now described, communication between the cavity and the outside surface of the cartridge shell, which is in contact with the water supply, can be made in other ways, such as by means of a simple radial hole.

The present invention makes it possible to impart to a thermostatic mixer a particularly advantageous performance since during movements of the movable box there is minimum wear and tear which remains substantially constant under different operating conditions despite thermal expansion of the parts and inexact manufacturing tolerances of their dimensions.

The instant invention is utilized in both thermostatic mixers with cartridges and in thermostatic mixers without cartridges.

This invention may be further developed within the scope of the following claims. Accordingly, the above specification is to be interpreted as illustrative of only a single operative embodiment of the present invention, rather than in a strictly limited sense.

I claim:

1. A thermostatic mixing valve with radial retention device comprising a first part containing a cavity, said cavity including a bottom comprised of an axially extending wall and two radially extending walls that face each other axially and are adapted to receive a ring-shaped packing washer which is inserted in said cavity and which cooperates with a surface of a second part where:

said cavity has a distance in the axial direction that is less than the undeformed diameter in the axial direction of the ring-shaped packing washer, the difference between said diameter and said distance being sufficient so as to axially compress the ring-shaped packing washer to the extent necessary to establish a hold between the ring-shaped packing washer and said radially extending surfaces;

said cavity has an annular chamber between the side of the cavity and said ring-shaped packing washer; and a passage in said first part of the apparatus to provide communication of said annular chamber with a space of the apparatus intended to hold a fluid, said passage containing at least one radially extending groove in one of said radially extending walls of said cavity.

2. Thermostatic mixing valve of claim 1 wherein said radially extending groove is extended by a section of an axially extending groove.

3. Thermostatic mixing valve of claim 1 wherein said ring-shaped packing washer is of the O-ring type.

4. Thermostatic mixing valve of claim 1 wherein said cavity containing said ring-shaped packing washer is made on the outside surface of a first internal part of the apparatus and that said surface of the second part cooperating with the ring-shaped packing washer is an inside surface of said second part.

5. Thermostatic mixing valve of claim 4 wherein the outside diameter of the ring-shaped packing washer in the compressed state is greater than the diameter of said inside surface of the second part, whereby a hold established between the ring-shaped packing washer and said inside surface of the second part, wherein the bottom of said cavity has a radial diameter that is less than the inside diameter of the ring-shaped packing washer in the compressed condition whereby play between said bottom and said ring-shaped packing washer is obtained.

6. Thermostatic mixing valve of claim 1 wherein said cavity containing said ring-shaped packing washer is made in the inside surface of a first outside part of the apparatus, and said surface of the second part cooperating with the ring-shaped packing washer is an outside surface of said second part.

7. Thermostatic mixing valve of claim 6 wherein the inside diameter of the ring-shaped packing washer in the compressed condition is less than the diameter of said outside diameter of the second part whereby a hold is established between the ring-shaped packing washer and said outside surface of the second part, and wherein the side of said cavity has a diameter in the radial direction that is greater than the outside diameter of the ring-shaped packing washer in the compressed condition, whereby there is play between said side and said ring-shaped packing washer.

8. Thermostatic mixing valve of claim 6 wherein said first part comprises a cartridge shell whose outside surface is in contact with water supplied under pressure.

9. Thermostatic mixing valve of claim 1 wherein said passage groove is made in the radial part of the cavity made in said first part of the apparatus, which is in the part of the space intended to receive cold water.

10. Thermostatic mixing valve of claim 1 wherein said first part is made of plastic material.

* * * * *